Aug. 31, 1965 R. C. CALE 3,203,389
STABILIZED PLANING HULL
Filed Oct. 18, 1961 2 Sheets-Sheet 2

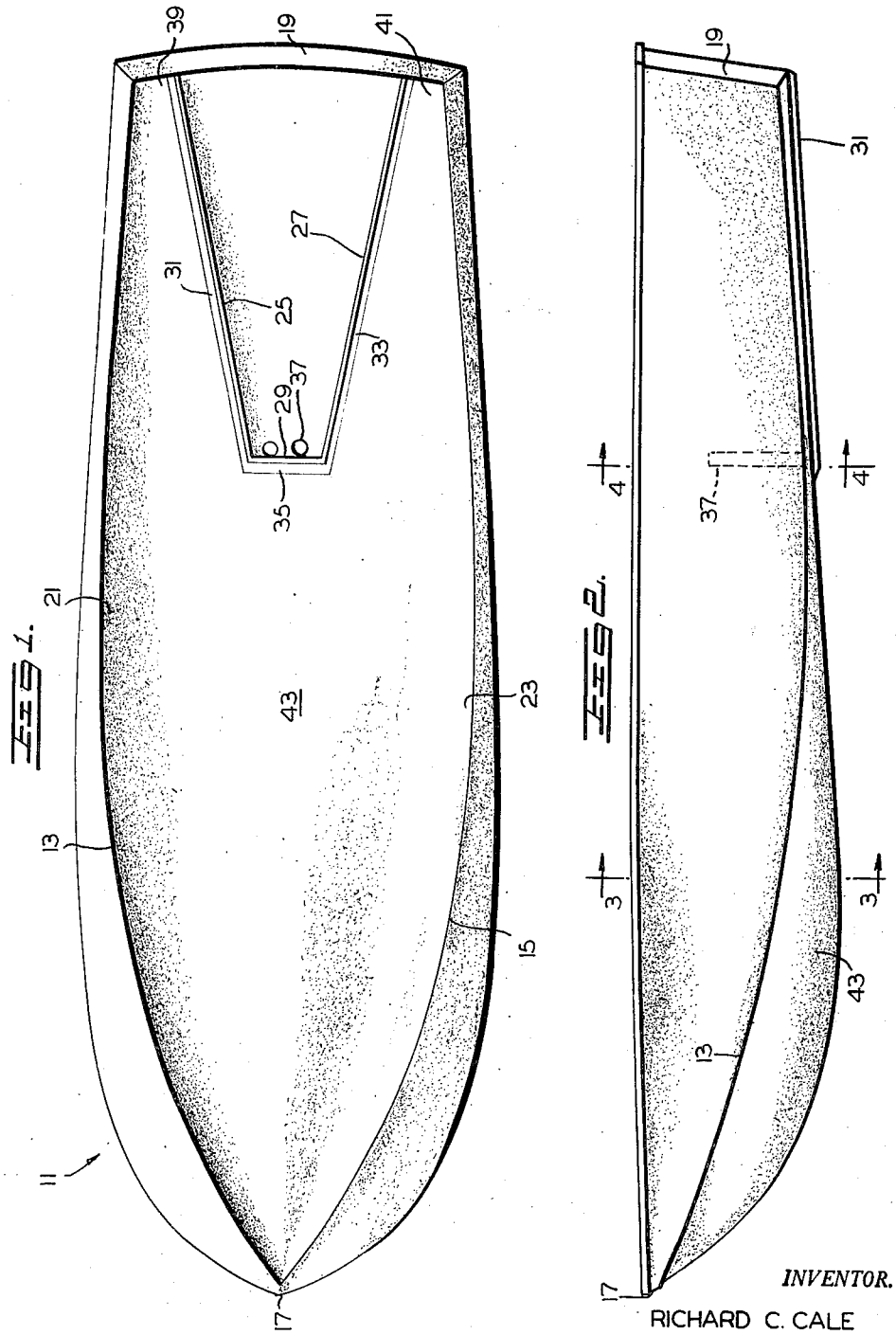

INVENTOR.
RICHARD C. CALE

United States Patent Office 3,203,389
Patented Aug. 31, 1965

3,203,389
STABILIZED PLANING HULL
Richard C. Cale, 1129 Swanston Drive,
Sacramento, Calif.
Filed Oct. 18, 1961, Ser. No. 145,822
9 Claims. (Cl. 114—66.5)

This invention relates to planing hulls and more particularly to a planing hull incorporating surfaces for controlling the dynamic forces of the water thereon.

In a planing boat in order to carry heavy loads at a high speed while using a reasonable amount of power, it is necessary that the hull rise and plane near the surface of the water. The energy necessary to sustain a planing hull at equilibrium when planing is derived from the hydrodynamic force of the water striking the hull and changing direction, thus creating kinetic energy which is the ultimate force that lifts the boat. Therefore, it is obvious that the greatest possible use and control should be made of this kinetic energy in order to obtain maximum benefits therefrom.

If the vertical lift is to be obtained from kinetic energy and is distributed throughout the hull to the various regions thereon in a proper manner, the resultant stability will provide a safer seagoing craft. Generally speaking, the planing hulls in use today depend almost entirely for their vertical lift on the concentration of dynamic lift developed at the leading edge of the hull where it comes into contact with the water. The amount and location of this vertical lift varies with the trim angle, which in turn varies with the speed and the particular weight distributon of the hull. By depending upon a dynamic lift only at the leading edge of the hull, a great deal of the kinetic energy which could be used in the form of lift is lost by the limited area used to convert this energy.

Accordingly, it is an object of this invention to provide a planing hull which will plane near the surface of the water with minimal power requirements.

Another object of this invention is to provide a planing hull which derives additional lift by changing the direction of the flow of the water striking the hull.

Still another object of this invention is to provide a planing hull which incorporates a cove structure for directing the lateral flow of water downwardly.

Yet another object of this invention is to provide a planing hull including members subtending from the aft bottom portion thereof for increasing the ultimate lift exerted by the water aft of the midship section of the hull.

Another object of this invention is to provide a planing hull wherein the kinetic energy of the water passing over the hull is utilized to create a vertical lift.

Yet another object of this invention is to provide a planing hull wherein the lateral flow of water passing over the hull is restricted aft of the midship section to produce a resultant increase in the total lift pressure.

Still another object of this invention is to provide a planing hull having lateral flow control surfaces depending from the planing surface.

A further object of this invention is to provide a planing hull having a vented lateral flow restriction depending from the aft portion of the planing surface.

A still further object of this invention is to provide a planing hull designed so as to relieve the wetted surface in the aft region of the hull and yet retain the maximum amount of vertical lift derived from the kinetic energy of the water.

Other objects of the invention will become obvious to those skilled in the art in the light of the following descripton when taken in conjunction with the accompanying drawings wherein:

FIG. 1 is a plan view of the bottom or planing surface of the hull;

FIG. 2 is an elevation view of the planing hull of FIG. 1;

Figure 3:
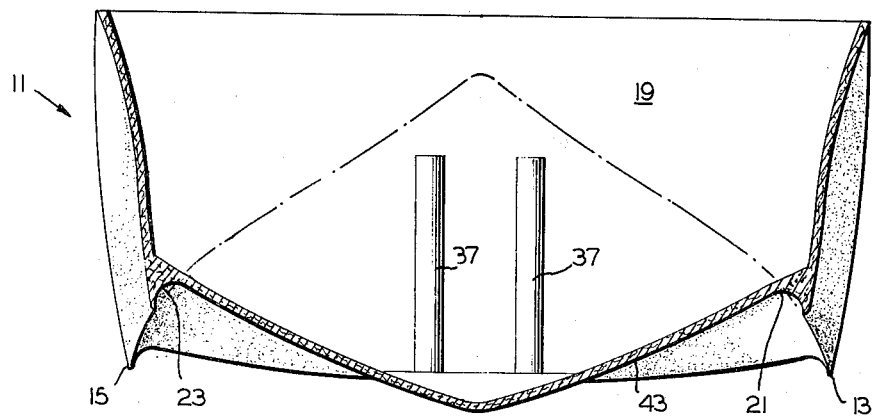
FIG. 3 is a sectional view of the hull taken along the lines 3—3 of FIG. 2.

Turning now more specifically to the drawings, the planing hull 11 incorporates chines 13 and 15 which extend from just below the bow 17 of the hull and sweep aft to the lower edge of the transom 19. The chines 13 and 15, in effect, are created by the termination of an extension of the sides of the hull itself as is more clearly shown in FIGS. 3–5. The sides meet interiorly with the planing surface 43 of the hull 11. As can be seen from the drawings, the planing surfaces 43 extend upwardly in a substantially straight line configuration from the keel of the hull to the point where they form a junction with the side extensions, with the exception of the usual streamlining around the keel section. Coves 21 and 23 are formed between the planing surface 43 and each side of the hull by means of concave surfaces. The outer edges of coves 21 and 23 terminate at the respective chines 13 and 15 and the inner edges are faired into the planing surface so as to provide a smooth, continuous surface. Although the drawings illustrate the invention as used with a preformed hull using a moldable material such as plastic or compositions composed of a binding and glass fibres, it is to be understood that a wooden construction could also be used wherein the coves could subsequently be formed with a fiber glass compound in order to attain the above described concave structure. The particular planing surface will be discussed in detail as the description proceeds.

In order to further increase the desired lift aft of the midship section of the hull, there may be formed on the bottom of the planing surface a V-shaped member which, in effect, is in opposition to the cove members 21 and 23. This V-shaped member may be formed by securing rib members 25 and 27 to the planing surface at an angle from the central part of the hull aft to the transom 19. The apex of the V-shaped member is closed by a further rib member 29. Smooth surfaces 31, 33 and 35, which may also be of a concave nature, are formed between the outer edge of the rib members and the planing hull 43. Located aft of the rib 29 at the apex of the V-shaped member are vents 37 which may be pipes extending upwardly into the hull. Pipes 27 allow air to be drawn downwardly and into the space due to the negative pressure created by the V when the hull is planing.

The V-shaped structure, as described above, creates a Venturi effect between the coves 21 and 23 and the rib members 25 and 27. According to well known principles, this Venturi effect increases the pressure of the water passing laterally along the planing surface and out the restricted areas 39 and 41.

Figure 4:
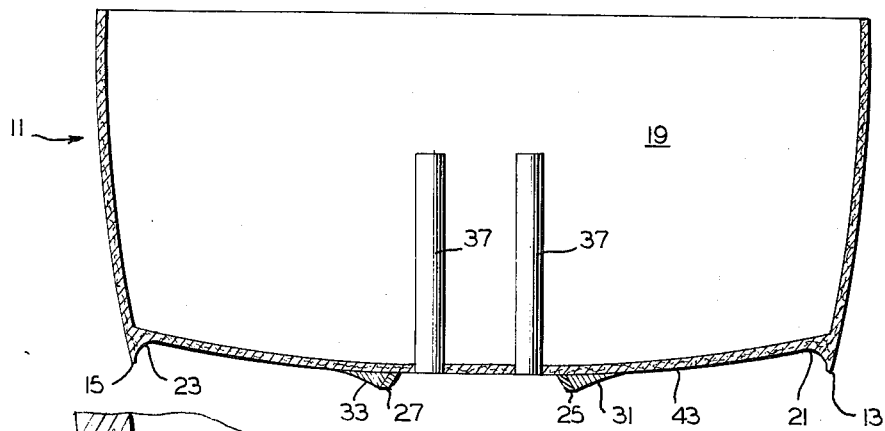
FIG. 4 is a sectional view of the hull taken along the lines 4—4 of FIG. 2.
Figure 5:
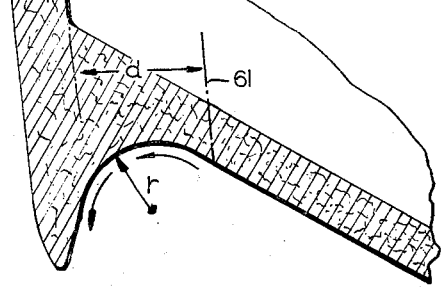
FIG. 5 is a fragmentary sectional view showing the details of the cove structure.

FIGS. 2–5 illustrate the particular chine structure described generally above. The chine forward starts high under the bow, widens rapidly to midship and gradually tapers toward the stern. The shape and size are such that the concave nature of the coves will direct substantially all of the lateral flow of water in a downward direction. The relationship of the cove to the sides and planing surface is illustrated in FIG. 5. Line 61 represents the inboard edge of the side of heretofore constructed planing hulls. In the present invention, the side has, in effect, been moved outwardly to accommodate the cove by an amount $d$. This distance $d$ varies from bow to stern and is approximately 8% of the measured beam between chines 13 and 15 progressing from the bow to the stern. Accordingly, the distance $d$ starts at zero just below the bow, increases to a maximum at midship and decreases aft to the transom as the beam of the boat varies. Although the radius $r$ of the cove is not critical so long as a smooth flow of water is obtained, it has been found that excellent results are obtained when using a radius $r$ of approximately 50% of the distance $d$. The length of the extension of the sides is, therefore, controlled by the distance $d$ and the radius $r$ with the extensions being sufficient to provide a smooth geometrical configuration of the cove so that no turbulence results due to the directing of the water in a downward direction as shown by the arrows, FIG. 5.

With this particular construction, a considerable amount of kinetic energy is imparted to the hull by the action of the lateral flow generated by the cove directing the water downwardly. Accordingly, the lateral flow provides additional lift by increasing the pressure throughout the entire area of the bottom of the hull that is in contact with the water.

FIGS. 1 and 4 show the construction of the supplemental V-member formed by the ribs 25, 27 and 29 together with the associated formed surfaces 31, 33 and 35. This V-shaped member is developed in an opposing direction to that of the cove starting near the center of the hull and ending at the transom substantially inboard from the cove members 21 and 23. The restrictions thus formed, ending in the confined areas 39 and 41, further increase the pressure between the coves and this developed V-shaped member. With the chines being joined to the hull by the cove surface, and the restriction of the V being also concave in nature, the pressure of the water is increased in this area. Accordingly, the two factors, the downward direction of the water created by the cove plus the increased pressure due to the retriction of the flow, produce a very substantial vertical lift.

The area between the ribs 25 and 27 is vented by air flowing down through the vent pipes 37 in the hull as mentioned above. This vent is provided in order to eliminate the natural vacuum or negative lift which would normally be created by the V-shaped member alone. Additionally, by filling this area with air, the vent allows the enclosed area to operate free of wetted surface which is a decided advantage in the higher speed ranges. Accordingly, at planing speeds this area is relieved of contact with the water and air passes down through the vent and out under the transom. The overall effect created by this structure is an area within the V-shaped ribs which is relieved of contact with the water, thus eliminating any possible negative lift, taken in combination with the above discussed pressure and water directive advantages of the outer part of the V and the cove which provides the positive lift desirable in a high speed planing boat. At lower speeds the area within the V-shaped section derives benefit from the resurging water forced down by the V-shaped strips, and little or no loss of efficiency occurs at displacement speeds.

In the present construction, the cove from the bow to the transom is shaped to turn the lateral flow of the water downward and is not merely designed as a spray rail. In contrast to a normal spray rail, the cove of the present invention is much larger and is curved in a manner to redirect the lateral flow of water so that solid water is directed downward instead of the spray which is developed by the normal spray rail.

A simile may be drawn between the effect produced by the V-shaped members and the cove and the pressure created thereby to the phenomena which results when operating a craft at high speed in confined water such as a narrow channel that is scarcely wider than the beam of the boat. The operating characteristics are the same in that, when travelling at high speeds, there is a pronounced lifting of the hull with a resultant increase in speed without increase in power consumption.

Numerous additional advantages are obtained by the construction of the present invention. As indicated above, the shape and size of the chine where it comes in contact with the water slices through the bow wake and all but eliminates the bow wake. At high speeds the entire sides of the hull are free of contact with the water and a minimum of chine wake develops. Test results have shown that the planing speed has been increased from approximately 35 m.p.h. for a standard hull to approximately 45 m.p.h. for the same basic hull design using the above discussed cove structure with no increase in the power output of the motor.

Further, the wide distribution of dynamic lift obtained by this construction also provides a high degree of dynamic stability. The dynamic lift is spread between and along the load bearing surfaces and, even though the stern is riding high, there is always a positive pressure at the cove which provides the effect of dampening the longitudinal oscillation. On turning, the high riding stern allows the boat to bank inboard smartly and to turn tight at 360° circles while still remaining on a full plane.

Generally speaking, a high speed planing boat uses a comparatively wide beam hull and, as a result, sacrifices some of the deadrise of a narrow beam boat from the keel to the chine. The amount of deadrise is one of the major factors in determining the softness of the riding qualities of the boat in rough water. Accordingly, planing hulls in use today are subjected to severe pounding in rough water. In the present invention, the sides of the hull are moved out at the line of the chine without disturbing the planing surface, thereby retaining the advantage of the deadrise forward while gaining the planing advantages of a wide beam boat. Additionally, porpoising is no problem throughout the full range of speeds since the bow with the high wide cove will not plunge or become engulfed in a wave even though deadrise is such that pounding is reduced to a snubbing action.

As will now be evident, the cove of the present invention may be used alone to obtain a substantial increase in speed, planing qualities and stability as discussed hereinabove. The inboard V structure may be added to further enhance the pressure characteristics at the stern of the hull, thus providing a further increase in efficiency at high planing speeds.

While there have been shown and described the fundamental novel features of the invention as applied to a preferred embodiment, it will be understood that various changes in form and details of the hull illustrated may be made by those skilled in the art, without departing from the spirit of the invention since the present invention is applicable to any type of planing hull. For instance, an existing hull could be adapted for use with the present invention by adding extending members to the sides and fairing them into the planing surface to create the above described cove. Additionally, the term "cove" is intended in its broadest sense since the water control surface so created is limited only by the effect of water turbulence. If an existing hull were to be adapted for use with the present invention as mentioned above, a broad V-shaped cross section could be formed and faired into the planing surface with beneficial results even though the smooth curvature is preferable.

I claim:

1. In a planing hull including a planing surface, flow control surfaces comprising a chine extending from below the bow of the hull on either side thereof to the outer lower edges of the transom, a continuous cove between each of said chines and said hull, a substantially V-shaped structure secured to the aft section of the planing surface with the apex of said V-shaped structure substantially centrally located on said planing surface and the legs of said structure extending aft to said transom and inboard of said coves, concave surfaces between the outer edges of said legs and said planing surface and means extending into said hull for venting the area of the planing surface enclosed by said V-shaped structure.

2. In a planing hull including a transom and a keel, flow control surfaces comprising, chines extending downwardly from the bow of said hull to said transom, substantially smooth planing surfaces extending in a substantially straight line configuration upwardly from said keel and forming junctions with said chines, said chines extending below said junctions, continuous coves between said chines and said planing surfaces, and legs forming a substantially V-shaped structure subtending from the aft portion of the planing surfaces with the apex of said structure located centrally on said keel and the legs of said structure extending aft to said transom inboard of said coves.

3. The apparatus of claim 2 further comprising venting means extending into said hull from within the area formed by the V-shaped structure.

4. The apparatus of claim 2 further comprising a concave surface between outboard edges of each of the legs of said V-shaped structure and the planing surface.

5. In a planing hull including a transom and a keel, apparatus for increasing the dynamic lift of water passing over the hull comprising downwardly extending chine members forming a continuation of the side of said hull from the bow of said hull to substantially the outer lower edge of said transom, the lower edge of said chine members terminating substantially above said keel from the bow of said planing hull to aft of the midship section of said hull, substantially smooth planing surfaces extending upwardly from the keel of said hull and forming continuous junctions with said chine members, and a continuous cove joining the lower edge of said chine to said planing surface, said cove extending continuously from said bow aft substantially the entire length of said hull.

6. The apparatus of claim 5 wherein the radius of said cove varies in substantially direct proportion to the beam width from the bow to the stern of the hull.

7. The apparatus of claim 5 further comprising members secured to the aft section of said planing surfaces having legs forming a substantially V-shape thereon, the apex of said V-shape being centrally located on said surface and the legs thereof extending aft to said transom and substantially inboard of said chines, and concave surface means between the outer edge of each of said legs and said planing surface.

8. A planing hull comprising a planing surface, a transom, a keel, sides extending between the bow of said hull and said transom, said sides being secured to said planing surface to form a continuous junction therewith, chine members extending downwardly of each of said sides below said continuous junction, the lower edge of said chine members terminating substantially above said keel from said bow to aft of the midship section of said hull, and a continuous concave control surface between each of said members and said planing surface extending from the bow aft substantially the entire length of the hull for directing the lateral flow of water in a downward direction.

9. In a hull including a transom and a keel, downwardly extending chine members on either side of said hull forming a continuation of the side of said hull, said chine members extending from below the bow of said hull aft substantially to the lower outer edge of said transom, the lower edge of each of said chine members terminating substantially above said keel from said bow to aft of the midship section of said hull, substantially smooth planing surfaces extending in a substantially straight line configuration from the keel of said hull upwardly to said chine members and forming junctions therewith, said chine members extending below said junctions, and continuous coves between said chine members and said planing surfaces extending from the bow aft substantially the entire length of the hull, said coves being faired into the upper portion of said planing surfaces so as to provide a smooth continuous surface therewith.

References Cited by the Examiner

UNITED STATES PATENTS

| | | | |
|---|---|---|---|
| 1,121,006 | 12/14 | Fauber | 114—66 |
| 1,189,227 | 7/16 | Baker | 114—66 |
| 1,396,831 | 11/21 | Gardner | 114—66 |
| 1,710,904 | 4/29 | Titcomb | 114—66 |
| 1,776,336 | 9/30 | Rohrbach | 114—66 |
| 1,831,339 | 11/31 | Brush | 114—66 |
| 2,234,899 | 3/41 | Higgins | 114—66 |
| 2,251,621 | 8/41 | Hoorn | 114—66 |
| 2,450,665 | 10/48 | Jutte | 114—66 |
| 2,677,139 | 5/54 | Canazzi | 114—142 X |
| 2,960,957 | 11/60 | Eddy | 114—66 X |
| 3,040,687 | 6/62 | Huet | 9—6 X |

FOREIGN PATENTS

| | | |
|---|---|---|
| 14,260 | 1915 | Great Britain. |
| 573,092 | 3/33 | Germany. |

FERGUS S. MIDDLETON, *Primary Examiner.*

MILTON BUCHLER, *Examiner.*